United States Patent
Mochizuki et al.

(10) Patent No.: US 6,574,555 B2
(45) Date of Patent: Jun. 3, 2003

(54) DISPLAY DEVICE WHICH DISPLAYS TRAFFIC INFORMATION IMAGES ON A MAP

(75) Inventors: Keisuke Mochizuki, Saitama (JP); Toshimichi Kasuya, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/907,936

(22) Filed: Jul. 19, 2001

(65) Prior Publication Data
US 2002/0032519 A1 Mar. 14, 2002

(30) Foreign Application Priority Data
Aug. 3, 2000 (JP) ......................................... 2000-235613

(51) Int. Cl.$^7$ ........................ G01C 21/00; G08G 1/0969
(52) U.S. Cl. ...................................... 701/211; 340/995
(58) Field of Search ................................. 701/201, 211, 701/208; 340/995, 905

(56) References Cited

U.S. PATENT DOCUMENTS

| | | | | |
|---|---|---|---|---|
| 5,293,163 A | * | 3/1994 | Kakihara et al. | 340/905 |
| 5,313,200 A | * | 5/1994 | Sone | 340/905 |
| 5,694,122 A | * | 12/1997 | Nakada | 340/988 |
| 5,739,773 A | * | 4/1998 | Morimoto et al. | 340/990 |
| 5,757,290 A | * | 5/1998 | Watanabe et al. | 340/988 |
| 5,831,552 A | * | 11/1998 | Sogawa et al. | 340/905 |
| 5,862,510 A | * | 1/1999 | Saga et al. | 340/990 |
| 5,908,464 A | * | 6/1999 | Kishigami et al. | 340/988 |

* cited by examiner

Primary Examiner—Michael J. Zanelli
(74) Attorney, Agent, or Firm—Sughrue Mion, PLLC

(57) ABSTRACT

A display device is provided, by which the road traffic information can be easily seen. The display device displays a map on a displaying section of the display device and also displays traffic information along roads in the map on the basis of road traffic information. The display device includes: a composing section for composing traffic information images having different forms from each other depending upon types of the traffic information; and a superposing section for superposing the traffic information images so that the traffic information images are alternately displayed on an image of the map.

7 Claims, 5 Drawing Sheets

FIG. 4A
| | |
|---|---|
| NO CONGESTION | LIGHT BLUE |
| CONGESTION TO SOME EXTENT | ORANGE |
| CONGESTION | RED |
| REGULATION (SPEED) | YELLOW |
| REGULATION (CHAINED-TIRE) | PINK |
| EXPRESSWAY | BLUE PERIPHERY |
| ORDINARY WAY | WHITE PERIPHERY |
FIG. 4B
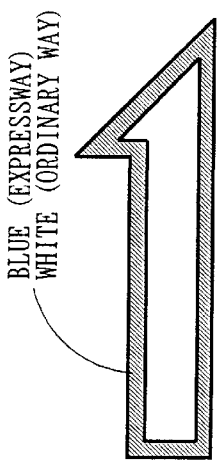
BLUE (EXPRESSWAY)
WHITE (ORDINARY WAY)
FIG. 1
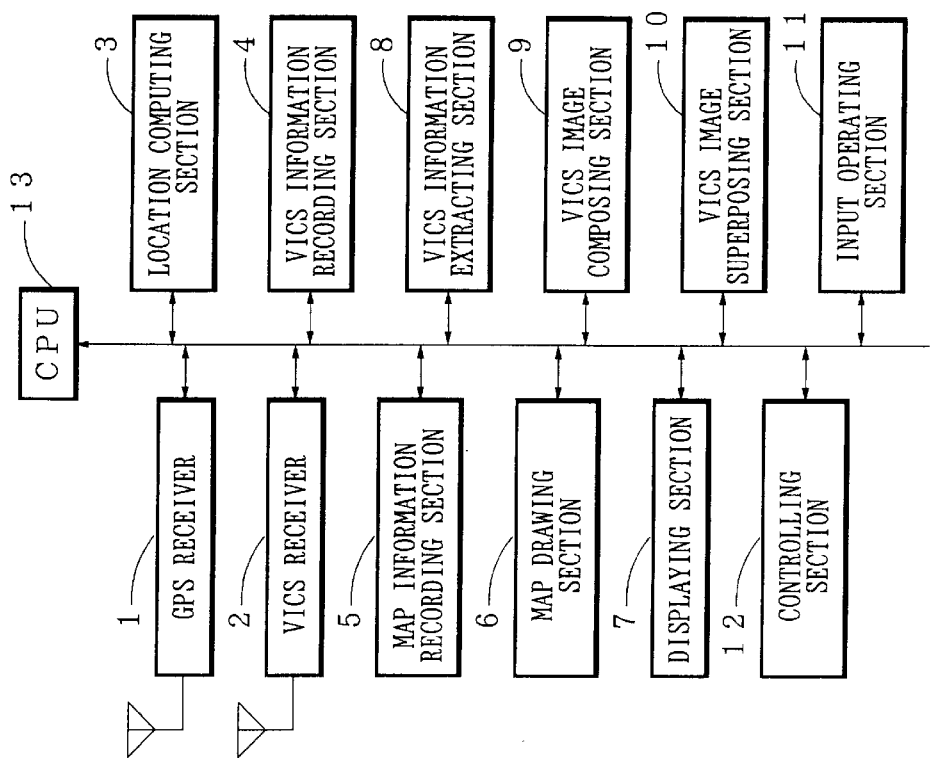

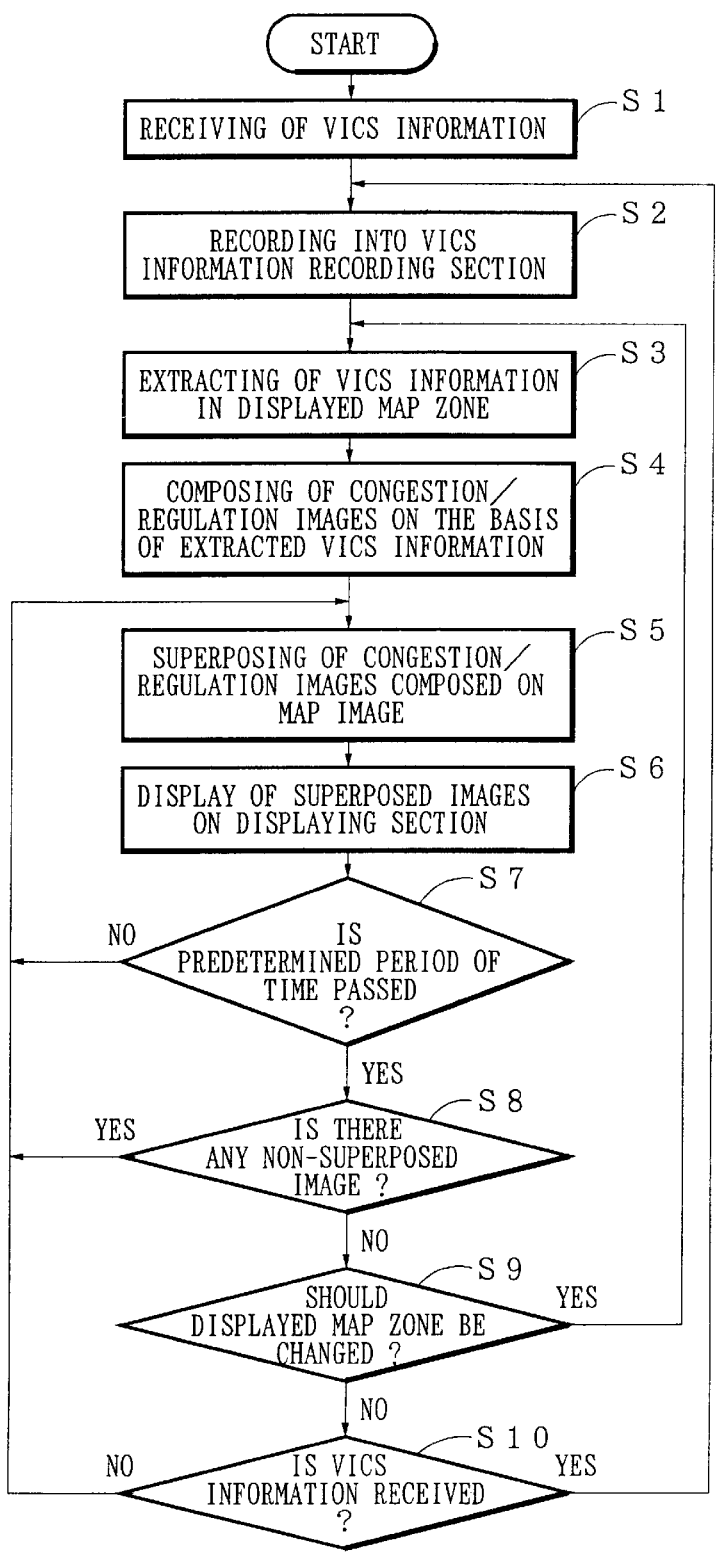

MAP

EXPRESSWAY (CONGESTION)

ORDINARY WAY (CONGESTION)

ORDINARY WAY (REGULATION)

DISPLAY DEVICE WHICH DISPLAYS TRAFFIC INFORMATION IMAGES ON A MAP

BACKGROUND OF THE INVENTION

(1) Field of the Invention

This invention relates to a display device, which displays road traffic information along the displayed roads.

(2) Description of the Related Art

Recently, a navigation device as a system for supporting the driving is widely used for a driver of a mobile unit to reach his or her destination. In this device, a GPS receiver mounted on the mobile unit receives GPS information sent from a plurality of GPS satellites, then a present position of the mobile unit is computed on the basis of the received information and then, on the basis of the computed position, a mark indicating the present position of the mobile unit can be displayed on a map, which is displayed on a displaying section disposed in the mobile unit.

Further, in this navigation device, besides that the present position of the mobile unit is displayed as the mark, various traffic information such as traffic congestion, traffic accident and traffic regulation provided from the outside of the mobile unit is received and displayed on the displaying section, thereby further supporting the driver.

A vehicle information communication system (VICS) of the Vehicle Information Communication System Center Incorporated Foundation is a typical system for providing traffic information.

When traffic information is displayed on a displaying section of a mobile unit on the basis of the VICS information, one can use three kinds of the displaying forms from the level 1 to the level 3. Particularly, when the level 3 of the displaying form is used, traffic congestion information, traffic regulation information and traffic accident information can be directly displayed on a map, which is displayed in a navigation device.

In the level 3 of the displaying form, arrows indicating traffic congestion information, traffic regulation information and traffic accident information are displayed along roads in the map. A driver can see the position and length of each arrow for the roads in the map, thereby the driver can recognize a position and a section of the traffic congestion, regulation and accident on actual roads.

When one receives traffic information, one may receive a plurality of different traffic informations with respect to the same section of one road. For example, when one receives traffic congestion information and traffic regulation information at the same time with respect to the same section of one road, arrows corresponding to the respective informations are displayed overlapped with each other in the level 3 of the displaying form, therefore one may hardly see one arrow out of the two arrows.

Furthermore, when a plurality of different roads are built above and below, which is often seen in a relation between an ordinary way and an expressway, an arrow indicating traffic information of one road and an arrow indicating traffic information of another road are displayed overlapped with each other, therefore one may hardly see one arrow out of the two arrows.

SUMMARY OF THE INVENTION

It is therefore an objective of the present invention to solve the above problem and to provide a display device, by which the road traffic information can be easily seen.

In order to attain the above objective, the present invention is to provide a display device, for displaying a map on a displaying section of the display device and also for displaying traffic information along roads in the map on the basis of road traffic information, comprising: a composing section for composing traffic information images having different forms from each other depending upon types of the traffic information; and a superposing section for superposing the traffic information images having different forms from each other so that the traffic information images are alternately displayed on an image of the map.

Preferably, the types of the traffic information consist of traffic information on expressways and traffic information on ordinary ways.

Preferably, the types of the traffic information consist of at least two out of traffic congestion information, traffic regulation information and traffic accident information.

Preferably, the superposing section superposes the traffic information images having different forms from each other so that the traffic information images are alternately displayed in a zone where the traffic information images overlap with each other on the image of the map.

Preferably, the superposing section superposes the traffic information images so that the traffic information image is always displayed in a zone where the traffic information images do not overlap with each other on the image of the map.

Preferably, the composing section composes the traffic information images so that the traffic information images are composed by using different displaying colors depending upon a type of the traffic information or a type of a road.

BRIEF DESCRIPTION OF THE DRAWINGS

FIG. 1 illustrates the constitution of a display device according to a preferred embodiment of the present invention;

FIG. 2 is an operational flow chart of the preferred embodiment of the present invention;

FIGS. 4A and 4B illustrate displaying colors;

DESCRIPTION OF THE PREFERRED EMBODIMENTS

Figure 3A:
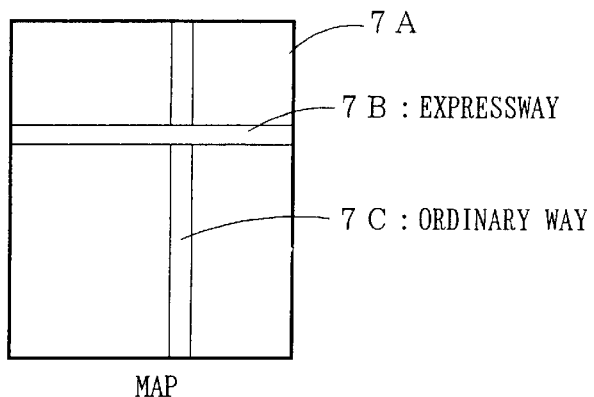
FIGS. 3A–3D are illustrations of images composed by a VICS composing section.

In the following, the preferred embodiments of the present invention will be explained with reference to the attached drawings.

FIG. 1 illustrates the constitution of a display device according to a preferred embodiment of the present invention. FIG. 2 is an operational flow chart of the preferred embodiment of the present invention.

FIG. 1 shows the display device according to the present invention, which is a vehicle navigation device on which a VICS receiver is mounted, consisting of GPS receiver 1, VICS receiver 2, location computing section 3, VICS information recording section 4, map information recording section 5, map drawing section 6, displaying section 7, VICS information extracting section 8, VICS image composing section 9, VICS image superposing section 10, input operating section 11, controlling section 12 and processor (CPU) 13 for carrying out the processing.

The GPS receiver 1 receives GPS information from a GPS satellite (not shown in the figure). The location computing section 3 computes the present location of the vehicle on the basis of the received GPS information.

The map drawing section 6 reads out the map information of the desired zone around the present location of the vehicle, which is computed by the location computing section 3, from the map information recording section 5, then composes an image of the map on the basis of the read-out map information and then, displays the image of the map on the displaying section 7 together with a mark indicating the present location of the vehicle.

The traffic information (hereinafter, VICS information) received by the VICS receiver 2 is recorded by the VICS information recording section 4. The VICS information extracting section 8 extracts the VICS information of the map zone, which is displayed on the displaying section 7 by the map drawing section 6, from the VICS information recording section 4.

The VICS image composing section 9 composes the VICS image on the basis of the extracted VICS information. The VICS image superposing section 10 superposes the composed VICS image on the image of the map, which is drawn by the map drawing section 6, and displays thus superposed images on the displaying section 7.

In the following, an operation of the display device according to the present invention will be explained with reference to FIG. 2.

The VICS information, which is received by the VICS receiver 2 at step S1, is recorded in the VICS information recording section 4 at step S2.

At step S3 the VICS information extracting section 8 extracts the VICS information of the map zone, which is displayed on the displaying section 7, from the VICS information recording section 4.

At step S4 the VICS image composing section 9 composes a congestion/regulation image on the basis of the VICS information extracted at step S3.

FIG. 3A shows a map 7A, which is displayed on the displaying section 7. In FIG. 3A, a reference numeral 7B indicates an expressway while a reference numeral 7C indicates an ordinary way.

Figure 3B:
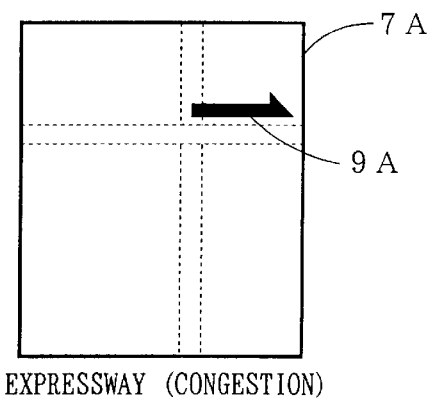
Figure 3C:
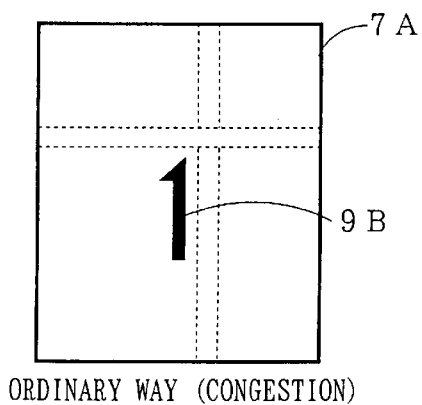
Figure 3D:
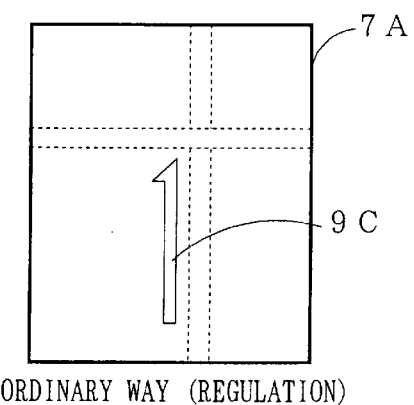

The VICS image composing section 9 composes the traffic information images, corresponding to traffic informations such as congestion/regulation zone of an expressway or an ordinary way, as shown in FIGS. 3B, 3C and 3D.

Supposing that there is traffic congestion for an expressway 7B in a map 7A shown in FIG. 3A and that there is traffic congestion and also regulation information for an ordinary way 7C, a traffic information image, in which a congestion zone is indicated by an arrow 9A along the expressway 7B, is composed as shown in FIG. 3B, while a traffic information image, in which a congestion zone is indicated by an arrow 9B along the ordinary way 7C as shown in FIG. 3C, and another traffic information image, in which a regulation zone is indicated by an arrow 9C along the ordinary way 7C as shown in FIG. 3D, are composed.

A color inside the arrow of the traffic information image is different depending upon the type of the road traffic information and is displayed with a color scheme shown in FIG. 4A, for example. That is, the color is light blue for no congestion, orange for congestion to some extent, red for congestion, yellow for speed regulation, and pink for chained-tire regulation.

The type of the roads, such as an expressway and ordinary way, can be distinguished by using arrows, a periphery of which is colored with blue for an expressway and with while for an ordinary way as shown in FIG. 4B.

Thus an expressway and ordinary way can be distinguished from each other by using the different color at the periphery of the arrow. Moreover, even for a zone in which an expressway and ordinary way are overlapped with each other, an expressway and ordinary way can be easily distinguished from each other by turning the display of the arrow on and off.

The colors for displaying are not limited to those shown in FIGS. 4A and 4B.

At step S5 the VICS image superposing section 10 superposes one image of the traffic information images composed at step S4 on the image of the map, which is drawn by the map drawing section 6.

At step S6 the displaying section 7 displays the image of the map, on which the traffic information is superposed at step S5.

At step S7 the VICS image superposing section 10 judges whether or not a predetermined time (for example, 0.5 second) is passed, then if judged passed, the system advances to step S8, on the other hand if there is a traffic information image that is not yet superposed, the system turns back to step S5 and next traffic information image composed at step S4 is superposed on the image of the map, and then the flow from step S5 to step 8 is repeated.

FIG. 5 shows an image displayed on the displaying section 7. As described above, the map drawing section 6 draws a map shown in FIG. 3A, while the VICS image composing section 9 composes traffic information images shown in FIGS. 3B, 3C and 3D.

Figure 5A:
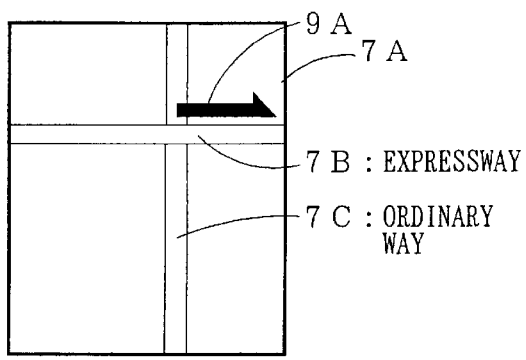
FIGS. 5A–5C illustrate a display on the displaying section.

The VICS image superposing section 10 first superposes a traffic information (expressway/congestion) image shown in FIG. 3B on the image of the map shown in FIG. 3A, thereby composing the superposed image shown in FIG. 5A. The superposed image is displayed for 0.5 second.

Figure 5B:
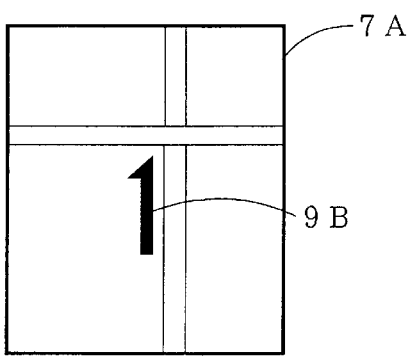

Then, the VICS image superposing section 10 superposes a traffic information (ordinary way/congestion) image shown in FIG. 3C on the image of the map shown in FIG. 3A, thereby composing the superposed image shown in FIG. 5B. The superposed image is displayed for 0.5 second.

Figure 5C:
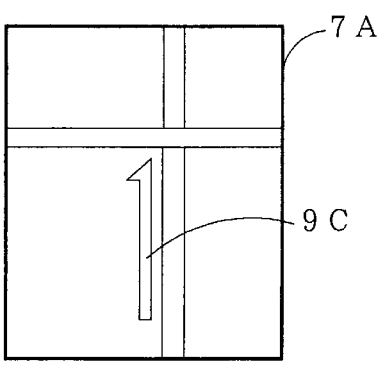

Then, the VICS image superposing section 10 superposes a traffic information (ordinary way/regulation) image shown in FIG. 3D on the image of the map shown in FIG. 3A, thereby composing the superposed image shown in FIG. 5C. The superposed image is displayed for 0.5 second.

Thus, the images such as traffic congestion and regulation are successively repeatedly displayed for a predetermined period of time, therefore a driver of the vehicle can easily see the traffic information even if the width of the arrow indicating the above-mentioned zone is constant.

After the display of the images such as traffic congestion and regulation is completed at step S8, the system advances to step S9, at which the controlling section 12 judges whether or not a zone of the map to be displayed, which is composed by the map drawing section 6, should be changed. If judged YES, the system turns back to step S3, then the steps S3 to S9 are repeated.

If judged NO, the system advances to step S10, at which the controlling section 12 judges whether or not the record in the VICS information recording section 4 is renewed. If judged NO, the system turns back to step 5, then the steps S5 to S10 are repeated. On the other hand, if judged YES, the system turns back to step 2, then the steps S2 to S10 are repeated.

In the preferred embodiment, as explained with reference to FIG. 5, each traffic information of an expressway or ordinary way, which is composed by the VICS image composing section 9, is successively displayed with being superposed with the image of the map. Instead, as shown in FIG. 6, the traffic information may be separately displayed from each other between an expressway and ordinary way.

That is, VICS image superposing section 10 successively superposes the traffic information images, which is composed by the VICS image composing section 9, on the image of the map with separating the traffic information images into the image of an expressway and that of an ordinary way.

Figure 6A:
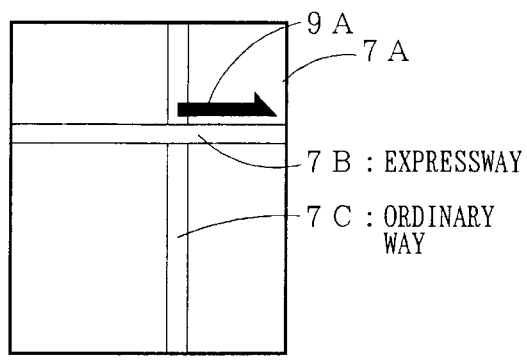
FIGS. 6A–6C illustrate a display on the displaying section.

In this example, as for the expressway, since the traffic information consists of only the traffic congestion as shown in FIG. 3B, the traffic congestion image shown in FIG. 3B is superposed on the image of the map shown in FIG. 3A, thereby a superposed image shown in FIG. 6A is composed and displayed for 0.5 second.

Figure 6B:
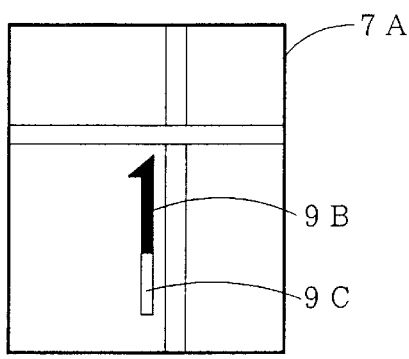

As for the ordinary way, first the traffic regulation image shown in FIG. 3D is superposed, then the fraffic congestion image shown in FIG. 3C is superposed on the image of the map shown in FIG. 3A, thereby a superposed image shown in FIG. 6B is composed and displayed for 0.5 second.

Figure 6C:
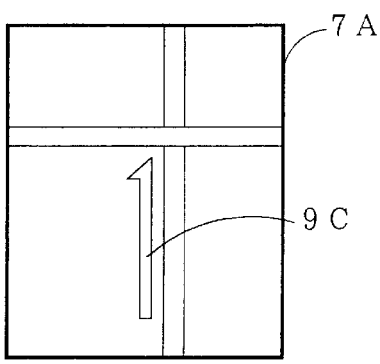

Then, the traffic regulation image shown in FIG. 3D is superposed on the superposed image shown in FIG. 6B, thereby a superposed image shown in FIG. 6C is composed and displayed for 0.5 second.

That is, each display as shown in FIG. 6A, 6B or 6C is repeated.

In this example, as for an ordinary way, a case of the two traffic information images shown in FIGS. 3C and 3D is explained. Instead, for example, when three traffic information images A, B and C of different types from each other are composed, first the images C, B and A are successively superposed on the image of the map and thus displayed, then the image B is further superposed on the displayed image and thus displayed and then, the image C is furthermore superposed on the displayed image and thus displayed and then, such a process is repeated likewise.

Figure 7A:
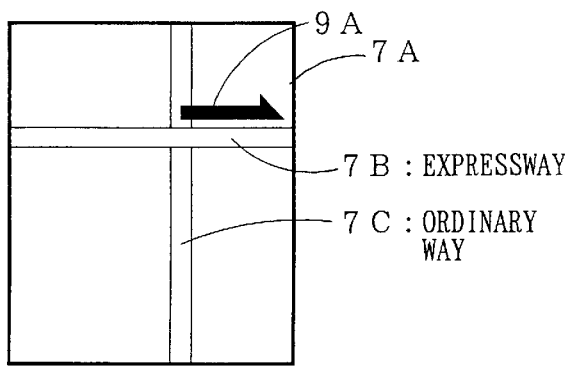
FIGS. 7A–7C illustrate a display on the displaying section.
Figure 7B:
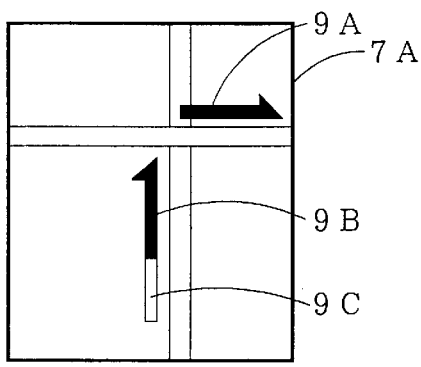
Figure 7C:
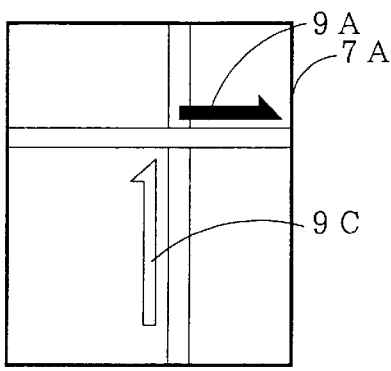

As shown in FIGS. 7A, 7B and 7C, an expressway may be always displayed, while an ordinary way may be displayed with being turned on and off.

That is, the VICS image superposing section 10 superposes the traffic congestion image of the expressway shown in FIG. 3B on the image of the map shown in FIG. 3A, thereby a superposed image shown in FIG. 7A is composed and displayed for 0.5 second.

Then, first the traffic regulation image of the ordinary way shown in FIG. 3D is superposed, then the fraffic congestion image of the ordinary way shown in FIG. 3C is superposed on the superposed image shown in FIG. 7A, thereby a superposed image shown in FIG. 7B is composed and displayed for 0.5 second.

Then, the traffic regulation image shown in FIG. 3D is superposed on the superposed image shown in FIG. 7B, thereby a superposed image shown in FIG. 7C is composed and displayed for 0.5 second.

That is, each display as shown in FIG. 7A, 7B or 7C is repeated.

In this connection, an ordinary way may be always displayed, while an expressway may be displayed with being turned on and off.

Figure 8A:
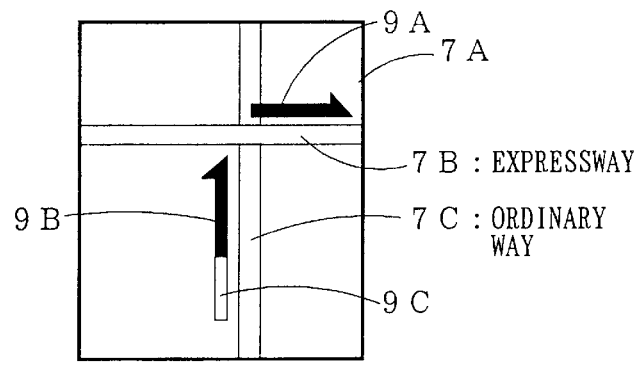
FIGS. 8A and 8B illustrate a display on the displaying section.
Figure 8B:
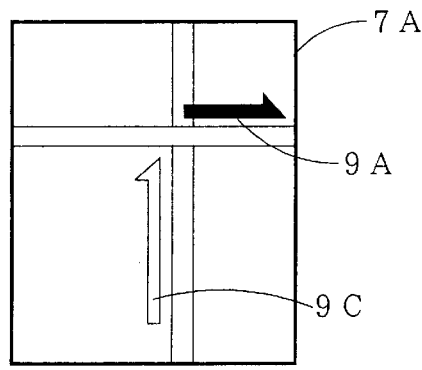

As shown in FIGS. 8A and 8B, an ordinary way may be displayed with being turned on and off after an expressway and ordinary way are simultaneously displayed.

That is, the VICS image superposing section 10 successively superposes the traffic congestion image of the expressway shown in FIG. 3B, the traffic regulation image of the ordinary ways shown in FIG. 3D, and the traffic congestion image of the ordinary way shown in FIG. 3C on the image of the map shown in FIG. 3A, thereby a superposed image shown in FIG. 8A is composed and displayed for 0.5 second.

Then, the traffic regulation image of the ordinary way shown in FIG. 3D is superposed on the superposed image shown in FIG. 8A, thereby a superposed image shown in FIG. 8B is composed and displayed for 0.5 second.

That is, each display as shown in FIG. 8A or 8B is repeated.

The aforementioned preferred embodiments are described to aid in understanding the present invention and variations may be made by one skilled in the art without departing from the spirit and scope of the present invention.

According to the present invention, each image corresponding to the respective traffic information of roads on the map is composed, then thus composed images are successively repeatedly superposed and displayed on the image of the map for a predetermined period of time, therefore a driver of the vehicle can easily see the traffic information.

Incidentally, the contents of Japanese Patent Application No. H12-235613 are hereby incorporated by reference.

What is claimed is:

1. A display device, for displaying a map on a displaying section of the display device and also for displaying traffic information along roads in the map on the basis of road traffic information, comprising:

a composing section for composing traffic information images having different forms from each other depending upon types of the traffic information; and a superposing section for superposing the traffic information images so that the traffic information images are alternately displayed on an image of the map, wherein a first traffic information image is displayed and then a second traffic information image is displayed in an alternating manner.

2. The display device according to claim 1, wherein the types of the traffic information consist of traffic information on expressways and traffic information on ordinary ways.

3. The display device according to claim 1, wherein the types of the traffic information consist of at least two out of traffic congestion information, traffic regulation information and traffic accident information.

4. The display device according to claim 1, wherein the superposing section superposes the traffic information images having different forms from each other so that the traffic information images are alternately displayed in a zone where the traffic information images overlap with each other on the image of the map.

5. The display device according to claim 1, wherein the superposing section superposes the traffic information images having different forms from each other so that traffic information image is always displayed in a zone where the traffic information images do not overlap with each other on the image of the map.

6. The display device according to claim 1, wherein the composing section composes the traffic information images so that the traffic information images are composed by using different displaying colors depending upon a type of the traffic information or a type of a road.

7. A method of controlling a display of traffic information images on a map comprising the steps of:

controlling a display of a map;

obtaining traffic information;

composing a first traffic information image and second traffic information image, each having a different form from that of the other, depending upon types of the obtained traffic information and;

displaying the first traffic information image on the displayed map and then displaying the second traffic information image on the displayed map instead of the first traffic information image, wherein the first traffic information image and the second traffic information image are displayed on the displayed map in an alternating manner.

* * * * *